(12) United States Patent
Enescu et al.

(10) Patent No.: US 9,374,716 B2
(45) Date of Patent: Jun. 21, 2016

(54) METHOD AND APPARATUS FOR COORDINATED MULTI-POINT OPERATIONS

(71) Applicant: Broadcom Corporation, Irvine, CA (US)

(72) Inventors: Mihai Enescu, Espoo (FI); Tommi Tapani Koivisto, Espoo (FI); Helka-Liina Määttänen, Helsinki (FI)

(73) Assignee: BROADCOM CORPORATION, Irvine, CA (US)

( * ) Notice: Subject to any disclaimer, the term of this patent is extended or adjusted under 35 U.S.C. 154(b) by 135 days.

(21) Appl. No.: 13/777,403

(22) Filed: Feb. 26, 2013

(65) Prior Publication Data

US 2013/0223253 A1 Aug. 29, 2013

(30) Foreign Application Priority Data

Feb. 27, 2012 (GB) .................................. 1203368.4

(51) Int. Cl.
*H04W 72/04* (2009.01)
*H04W 52/40* (2009.01)
*H04W 24/02* (2009.01)
*H04B 7/02* (2006.01)
(Continued)

(52) U.S. Cl.
CPC .............. *H04W 24/02* (2013.01); *H04B 7/024* (2013.01); *H04B 7/0619* (2013.01); *H04B 7/0456* (2013.01); *H04B 7/0617* (2013.01); *H04B 7/0626* (2013.01); *H04B 7/0632* (2013.01); *H04B 7/0658* (2013.01)

(58) Field of Classification Search
CPC ..... H04W 72/04; H04W 52/40; H04W 24/00; H04W 80/04
See application file for complete search history.

(56) References Cited

U.S. PATENT DOCUMENTS

| | | | |
|---|---|---|---|
| 2012/0002743 A1* | 1/2012 | Cavalcante | H04B 7/024 375/267 |
| 2012/0196607 A1* | 8/2012 | Samardzija | H04J 11/0053 455/450 |
| 2012/0287799 A1* | 11/2012 | Chen et al. | 370/252 |

(Continued)

FOREIGN PATENT DOCUMENTS

WO    WO 2012/096394 A1    7/2012

OTHER PUBLICATIONS

3GPP TR 36.819 v11.1.0, Technical Specification Group Radio Access network, "Coordinated multi-point operation for LTE physical layer aspects" (Release 11), Dec. 2011 (69 pages).

(Continued)

*Primary Examiner* — Andrew Lee
(74) *Attorney, Agent, or Firm* — Foley & Lardner LLP; Christopher J. McKenna; Paul M. H. Pua

(57) ABSTRACT

Embodiments provide a feedback indicator for coordinated multi-point operations of various coordinated multi-point schemes and/or scenarios. An exemplary embodiment involves generating a feedback indicator for coordinated multi-point operations, the feedback indicator indicating a recommendation for a CoMP controller entity to request signaling of multi-point feedback information with respect to multiple coordinated multi-point transmission points, and signaling the generated feedback indicator for coordinated multi-point operations to the CoMP controller entity.

18 Claims, 10 Drawing Sheets

(51) Int. Cl.
*H04B 7/04* (2006.01)
*H04B 7/06* (2006.01)

(56) References Cited

U.S. PATENT DOCUMENTS

| | | | |
|---|---|---|---|
| 2013/0017825 A1* | 1/2013 | Li et al. | 455/425 |
| 2013/0028180 A1* | 1/2013 | Gao et al. | 370/328 |
| 2013/0029657 A1* | 1/2013 | Gao et al. | 455/422.1 |
| 2013/0039349 A1* | 2/2013 | Ebrahimi Tazeh Mahalleh et al. | 370/336 |
| 2013/0094604 A1* | 4/2013 | Mondal et al. | 375/295 |
| 2013/0107915 A1* | 5/2013 | Benjebbour et al. | 375/219 |
| 2013/0223253 A1* | 8/2013 | Enescu et al. | 370/252 |
| 2014/0016565 A1* | 1/2014 | Ode et al. | 370/328 |
| 2014/0044061 A1* | 2/2014 | Yue et al. | 370/329 |
| 2014/0056156 A1* | 2/2014 | Jongren | 370/252 |
| 2014/0133345 A1* | 5/2014 | Wang et al. | 370/252 |
| 2014/0219115 A1* | 8/2014 | Etemad et al. | 370/252 |
| 2014/0328312 A1* | 11/2014 | Seo et al. | 370/329 |

OTHER PUBLICATIONS

CATT, 3GPP TSG RAN WG1 Meeting #67, R1-113731, "Discussion on feedback mechanisms for CoMP," San Francisco, USA, Nov. 14-18, 2011 (4 pages).

MCC Support, 3GPP TSG RAN WG1 Meeting #67, R1-114352, Final Report of 3 GPP TSG RAN WG1 #66bis v1.1.0, (Zhuhai, P.R. China, Oct. 10-14, 2011), San Francisco, USA, Nov. 14-18, 2011 (84 pages).

MCC Support 3GPP TSG RAN WG1 Meeting #66bis, R1-112886, "Final Report of 3 GPP TSG RAN WG1 #66 v1.0.0," Zhuhau, P.R. China, Oct. 10-14, 2011 (104 pages).

UKIPO Search Report under Section 17 compiled Sep. 14, 2012 which is issued in a related British Application No. GB 1203368.4 (1 page).

Combined Search and Examination Report for GB Application No. 1203368.4 dated Sep. 17, 2012.

Notification of Grant for GB Application No. 1203368.4 dated Feb. 25, 2014.

* cited by examiner

METHOD AND APPARATUS FOR COORDINATED MULTI-POINT OPERATIONS

CROSS REFERENCE TO RELATED APPLICATION

This application claims the benefit under 35 U.S.C. §119 (a) and 37 CFR §1.55 to UK Patent Application No. 1203368.4, filed on Feb. 27, 2012, the entire content of which is incorporated herein by reference.

TECHNICAL FIELD

Embodiments relate to a feedback indicator for coordinated multi-point operations. More specifically, embodiments relate to methods, apparatuses and computer program products for realizing a feedback indicator for coordinated multi-point operations of various coordinated multi-point schemes and/or scenarios.

BACKGROUND

In modern (wireless and/or cellular) communication systems, such as e.g. LTE and LTE-A and its successors, multiple-input multiple-output (MIMO) systems, including single-user (SU-) and multi-user (MU-) MIMO systems, are gaining increasing attention and importance. Such MIMO systems are typically sensitive to network performance limitations in view of (e.g. inter-cell) interference, especially at cell edges.

Coordinated multi-point (CoMP) transmission/reception operations are adopted as a technique for improving coverage of high data rates, cell-edge through put/performance, and system throughput/performance. In downlink CoMP operations, multiple points (which in practice may typically be base stations, remote radio heads, access nodes or the like) co-operate in scheduling and transmission of downlink communications in order to strengthen a desired signal and mitigate inter-cell interference. In this regard, a point is regarded as a set of geographically co-located transmit antennas at one site, and a site including a plurality of sectors has a corresponding plurality of different points, each corresponding to a given sector of the site. A cell may be formed by one or multiple points, meaning that one cell can include transmit antennas co-located at a single geographical location and/or distributed over multiple geographical locations.

In terms of CoMP, intra- and inter-cell downlink COMP operations in homogeneous and heterogeneous network deployments are specifically considered.

In the context of CoMP operations, various CoMP schemes (also referred to as CoMP categories) are considered. Such CoMP schemes include joint transmission (JT), dynamic point selection (DPS), and coordinated scheduling/beamforming (CS/CB). In joint transmission (JT) CoMP, two or more points transmit simultaneously to a CoMP user. Dynamic point selection (DPS) refers to a CoMP scheme where the transmission point is switched according to changes in channel and interference conditions. In coordinated beamforming/scheduling (CB/CS) CoMP, the scheduling decisions of neighbor points are coordinated in order to reduce interference. In principle, all of these CoMP schemes may include dynamic point blanking/muting which means that one or more transmission points are blanked/muted (i.e. turned off) to decrease interference.

Further, in the context of CoMP operations, various CoMP scenarios are considered. Such CoMP scenarios include an intra-site scenario (in a homogeneous network) where multiple co-located sectors of the same base station site are cooperating (referred to as scenario 1), an inter-site scenario (in a homogeneous network) with high power remote radio heads (RRH) where multiple non-co-located points having the same transmit power are cooperating (referred to as scenario 2), a heterogeneous network scenario with low power RRHs within the coverage of a high power macro cell, each operating in/as its own cell (referred to as scenario 3), and a heterogeneous network scenario with low power RRHs within the coverage of a high power macro cell, each operating in/as the same cell (referred to as scenario 4). The above stated list of CoMP scenarios is not to be understood as being exhaustive. Other CoMP scenarios may be envisioned.

Generally, CoMP operations rely on feedback. Namely, a CoMP transmission point typically relies on channel state information (CSI) feedback from a CoMP user. In downlink CoMP operations, such CSI feedback is provided in the uplink direction from a terminal or user equipment (UE) serving as the CoMP user to a base station, access node, evolved NodeB (eNB), or the like serving as the CoMP transmission point.

For the different CoMP schemes mentioned above, different types and/or contents of CSI feedback are effective or required for the CoMP transmission point so as to perform the respective CoMP scheme in an efficient and appropriate manner.

In view thereof, when CoMP operations are implemented in a variety of CoMP schemes and/or CoMP scenarios, there is a problem in identifying when providing CoMP CSI feedback is more appropriate than providing per-point CS feedback with respect to CoMP controller entity for supporting a given CoMP operation. It is noted that transmission of CoMP feedback uses UL resources. If CoMP will not be used by the base station, e.g. in the initial stage or when exiting CoMP mode, no benefit is gained from using the UL resources for CoMP feedback.

Accordingly, there is a desire or even need to realize a feedback indicator for coordinated multi-point operations of various coordinated multi-point schemes and/or scenarios.

SUMMARY

Various exemplary embodiments aim at addressing at least part of the above issues and/or problems and drawbacks.

Various aspects of exemplary embodiments are set out in the appended claims.

According to a first embodiment, there is provided a method including generating a feedback indicator for coordinated multi-point operations, the feedback indicator indicating a recommendation for a CoMP controller entity to request signaling of multi-point feedback information with respect to multiple coordinated multi-point transmission points, and signaling the generated feedback indicator for coordinated multi-point operations to the CoMP controller entity. The first embodiment may conveniently be performed by a user equipment.

According to a second embodiment, there is provided a method including obtaining a feedback indicator for coordinated multi-point operations indicating a recommendation for a CoMP controller entity to request signaling of multi-point feedback information with respect to multiple coordinated multi-point transmission points, and checking whether requesting signaling of multi-point feedback information is recommended based on the obtained feedback indicator. The second embodiment may conveniently be performed by a radio access node.

According to a third embodiment, there is provided an apparatus including a processing system, which may be embodied by at least one processor, at least one memory including computer program code, and at least one interface configured for communication with at least another apparatus. The at least one processor and computer program code is arranged to cause the apparatus to: generate a feedback indicator for coordinated multi-point operations indicating a recommendation for a CoMP controller entity to request signaling of multi-point feedback information with respect to multiple coordinated multi-point transmission points, and signal the generated feedback indicator for coordinated multi-point operations to the CoMP controller entity. The third embodiment may conveniently be implemented on or in conjunction with a user equipment.

According to a fourth embodiment, there is provided an apparatus including a processing system, which may be embodied by at least one processor, at least one memory including computer program code, and at least one interface configured for communication with at least another apparatus. The at least one processor and computer code is arranged to cause the apparatus to obtain a feedback indicator for coordinated multi-point operations indicating a recommendation for a CoMP controller entity to request signaling of multi-point feedback information with respect to multiple coordinated multi-point transmission points, and check whether requesting signaling of multi-point feedback information is recommended based on the obtained feedback indicator. The fourth embodiment may conveniently be implemented on or in conjunction with a radio access node.

According to a fifth embodiment, there is provided a non-transitory computer-readable storage medium including a set of instructions which, when executed on a user equipment apparatus, is configured to cause the apparatus to carry out the method according to the first embodiment.

According to a sixth embodiment, there is provided a non-transitory computer-readable storage medium including a set of instructions which, when executed on a radio access node apparatus, is configured to cause the apparatus to carry out the method according to the second embodiment.

By virtue of any one of the aforementioned exemplary embodiments, a feedback indicator for coordinated multi-point operations for various coordinated multi-point schemes and/or scenarios is provided, which is effective in terms of allowing seamless coordinated multi-point operations and providing fallback support to single-point operations. Such a feedback indicator for coordinated multi-point operations may in the following also be referred to as a CoMP feedback indicator.

By way of exemplary embodiments, there is provided a feedback indicator for coordinated multi-point operations. More specifically, by way of exemplary embodiments, there are provided mechanisms for realizing a feedback indicator for coordinated multi-point operations of various coordinated multi-point schemes and/or scenarios (in/for cellular communication systems).

Thus, enhancements and/or improvements are achieved by methods, apparatuses and computer program products capable of realizing a feedback indicator for coordinated multi-point operations, namely coordinated multi-point operations of various coordinated multi-point schemes and/or scenarios.

BRIEF DESCRIPTION OF DRAWINGS

For a more complete understanding of exemplary embodiments of the present invention, reference is now made to the following description taken in connection with the accompanying drawings in which.

DETAILED DESCRIPTION

Figure 1:
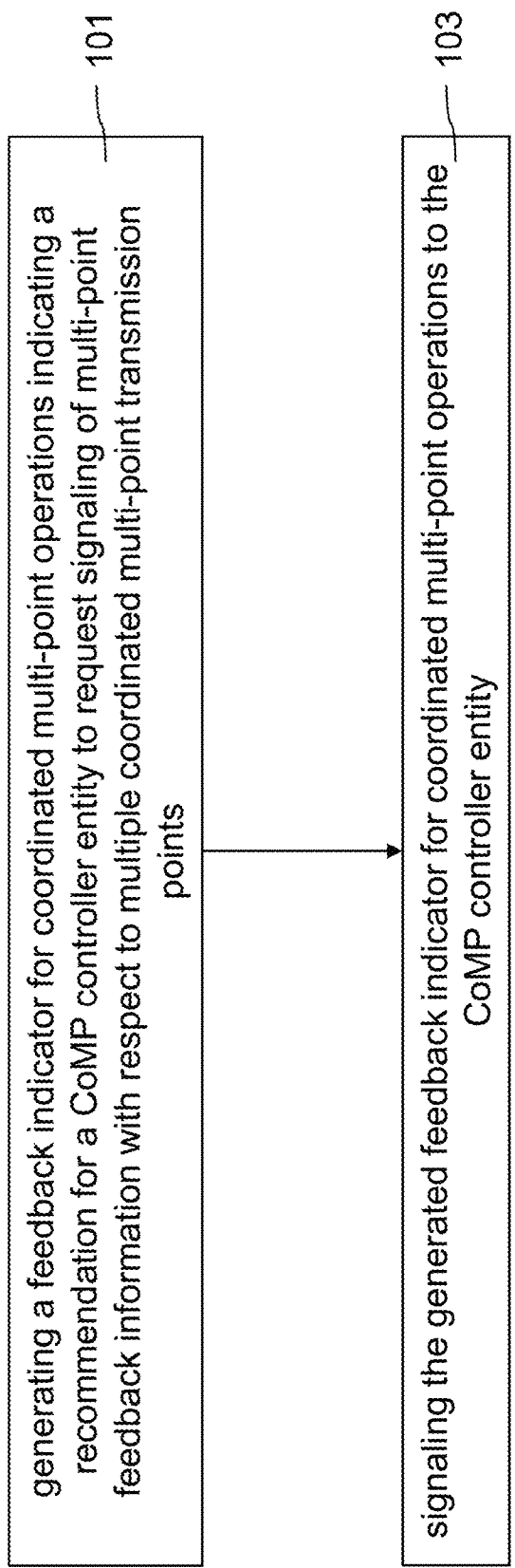
FIG. 1 shows a flowchart of an example of a procedure at a CoMP user entity according to an exemplary embodiment.

Exemplary embodiments will be described herein below. More specifically, exemplary embodiments are described hereinafter with reference to particular non-limiting examples.

It is to be noted that the following description of embodiments mainly refers to specifications being used as non-limiting examples for certain exemplary network configurations and deployments. Namely, embodiments are mainly described in relation to 3GPP specifications being used as non-limiting examples for certain exemplary network configurations and deployments. In particular, a LTE/LTE-Advanced communication system is used as a non-limiting example for the applicability of thus described exemplary embodiments. As such, the description of exemplary embodiments given herein specifically refers to terminology which is directly related thereto. Such terminology is only used in the context of the presented non-limiting examples, and does naturally not limit the invention in any way. Rather, any other network configuration or system deployment, etc. may also be utilized as long as compliant with the features described herein.

In particular, embodiments may be applicable in any, but not limited to, (cellular) communication system and/or network deployment in which coordinated multi-point (CoMP) transmission/reception operations, particularly coordinated multi-point (CoMP) operations of various coordinated multi-point schemes and/or scenarios, are operable.

Hereinafter, various embodiments are described using several alternatives. It is generally noted that, according to certain needs and constraints, all of the described alternatives may be provided alone or in any conceivable combination (also including combinations of individual features of the various alternatives).

According to exemplary embodiments, in general terms, there are provided mechanisms and means for a feedback indicator for coordinated multi-point operations of various coordinated multi-point schemes and/or scenarios.

Generally, the exemplary embodiments are applicable to any CoMP schemes and/or scenarios, including those mentioned herein as well as any other conceivable CoMP schemes and/or scenarios available at present and/or in the future.

In the following, exemplary embodiments are described with reference to methods, procedures and functions, as well as with reference to structural arrangements and configurations.

Generally, any procedures according to exemplary embodiments are operable at a CoMP user entity and/or at a CoMP TX point representing the CoMP controller entity and/or between the same, which may generally be referred to herein as a radio access node. As described herein below, a CoMP user entity may be implemented at/in/by any terminal side entity of a cellular communication system, such as a UE or the like, and a CoMP controller entity may be implemented at/in/by any network side entity of a cellular communication system (capable of controlling CoMP transmission/reception and/or operation, e.g. (CoMP) transmission points), such as an eNB or the like.

It is noted that the CoMP controller entity may or may not be co-located with a CoMP transmission (TX) point. That is, while the CoMP user entity is served by, i.e. communicates with, one or more TX points (e.g. (CoMP TX points), the CoMP controller entity may be implemented at/in/by a different site or apparatus than the one or more TX points (e.g. CoMP TX points), and may represent the serving CoMP TX point of the CoMP user entity.

Any procedures according to exemplary embodiments or, stated in other words, the underlying CoMP system including a CoMP user entity and a CoMP TX point, are operable in any conceivable CoMP scenario. For example, referring to the above-mentioned CoMP scenarios, in CoMP scenario 1 a CoMP TX point may be operable at/in/by a base station (in a homogeneous network), i.e. a sector of (the transmit antennas) thereof cooperating with another sector of (the transmit antennas) thereof, in CoMP scenario 2 a CoMP TX point may be operable at/in/by a high power remote radio head or base station (in a homogeneous network), i.e. an access point at a specific base station site cooperating with another access point at a different base station site, in CoMP scenario 3 a CoMP TX point may be operable at/in/by a low power remote radio head or base station within the coverage of a high power macro cell or base station (in a heterogeneous network), i.e. an access point at a specific base station site cooperating with another access point at a different base station site, which operate in/as different cells, and in CoMP scenario 4 a CoMP TX point may be operable at/in/by a low power remote radio head or base station within the coverage of a high power macro cell or base station (in a heterogeneous network), i.e. an access point at a specific base station site cooperating with another access point at a different base station site, which operate in/as the same cell.

As already stated, CoMP is intended to improve the performance of cell edge users, since especially at cell edge the performance is interference limited. A CoMP measurement set is formed by M cells/points for which the UE is measuring channel state information. The cooperation/reporting set is limited to N cells/points defining the number of points involved in the actual CoMP scheme for which CSI feedback is reported. Such CoMP reporting may be limited to two or three points. However, the number of points actually involved in the CoMP scheme is neither limited nor needed to be mentioned in specifications. The point from which the UE would receive transmission in single-point mode is defined as the serving point. Hence the UE will be measuring M cells/points, or more generally M channel state information reference symbols CSI-RS resources. From this the UE reports CSI feedback for N CSI-RS resources where it is likely that N=M.

In LTE Rel-10, different reference symbols (PS) were defined for CSI estimation and data demodulation purposes. Namely, channel state information reference symbols (CSI-RS) and demodulation reference symbols (DM-RS), Physical downlink shared channel (PDSCH) resource element muting is also specified by way of a zero-power CSI-RS configuration, which allows for multi-cell channel estimation/evaluation due to reducing interference in channel measurement. In LT Rel-11, it has been agreed that the UE may receive multiple CSI-RS configurations, that is, multiple CSI-RS resources transmitted from multiple points. Typically the eNB would configure the UE to measure multiple CSI-RS resources such that one configuration of CSI-RS resources corresponds to transmission from one point, i.e. the reference signals transmitted within the resources given by one CSI-RS configuration are all transmitted from the same geographical location/point. Hence, the CSI feedback measured from one CSI-RS resource typically corresponds to CSI feedback for one point.

Such feedback is implemented as implicit feedback which consists of following:

Rank report (RI), which indicates the recommended number of spatially multiplexed transmission layers, Precoding matrix indicator (PMI), which indicates the recommended precoder index in a predetermined codebook. Each precoder indicates the antenna weights to be applied at the transmit antennas for optimum performance, and Channel quality indicator (CQI), which indicates the modulation and coding scheme to be applied, hence enabling for link adaptation at the eNB side.

It is to be noted that such feedback may also be implemented as explicit feedback.

Typically, the UE estimates the channel, selects rank and PMI and calculates the post-processing (after receiver) signal to interference plus noise ratio (SINR) and derives the CQI based on these parameters, CQI may be seen as indicative of the post-processing SINR. LIE Rel-10 feedback operates per point, i.e. the UE only provides RI/PMI/CQI feedback for one point. In LTE Rel-11, as part of CoMP, a UE may receive CSI-RS resources for more than one point and it is possible to design aggregated feedback over multiple CSI-RS resources or per point feedback per CSI-RS resource. The per-point PMIs may be improved by a combiner (inter-CSI-RS resource) feedback, which may be an inter-point phase, an inter-point amplitude value and/or a point selection indicator. The following table summarizes the feedback and channel estimation options for each CoMP scheme:

|  | JT | DPS + muting | CS/CB + muting |
| --- | --- | --- | --- |
| Feedback | 1) Per CSI-RS resource PMI/CQI (+inter-CSI-RS resource feedback) 2) Per CSI-RS resource PMI (+inter-CSI-RS resource feedback) + aggregated CQI + serving point CQI 3) Aggregated PMI/CQI + serving point PMI/CQI | Per CSI-RS resource PMI/CQI + point selection indication + possible muting indication | Per CSI-RS resource PMI/CQI or CS/CB + muting specific additional feedback |
| Channel estimation | Per point CSI-RS or aggregated single CSI-RS pattern | Per point CSI-RS | Serving point CSI-RS + possibly other point CSI-RS |

On the uplink, there are two possibilities of CSI feedback reporting: the first method involves aperiodic reporting on physical uplink shared channel (PUSCH), in which case the eNB may at any time trigger the UE to report CSI feedback using a separate CQI tigger included in the uplink scheduling grant. The second method involves periodic reporting on a physical uplink control channel (PUCCH), in which case the UE is configured with periodic reporting instants and is hence continuously reporting CSI feedback. Typically, PUCCH is low rate feedback, e.g. in Release 8 to 10 the maximum number of feedback payload bits is 11, while richer and hence higher rate CSI feedback can be included on PUSCH with even hundreds of payload bits.

in LTE Rel-8 the channel state information (CSI) feedback consists of the three distinct components RI, PMI and CQI as described above. In the LTE Rel-8 PUCCH feedback schemes the CQIs and the PMIs feedback are jointly encoded while the RI is encoded separately. This is due to the fact that the value of RI determines the payload of the rest of the CSI.

In LTE Rel-10 the channel state information feedback consists of the same quantities as in LTE Rel-8 (that is CQI, RI) while for eight transmit antennas the PMI is constructed from two precoding indexes PMI1 and PMI2. The PMI1 and PMI2 correspond to the precoding codebooks W1 and W2.

The following framework is set for an implementation of CSI-RS in connection with CoMP. In this framework, "CSI-RS resource" may refer to a combination of "resourceConfig" and "subframeConfig" which are configured by higher layers. As part of the framework, a common feedback/signalling framework suitable for the scenarios described above that can support CoMP JT, DPS and CS/CB is to be standardized. The feedback scheme is to be composed from one or more known feedback schemes, which are, for example: feedback that is aggregated across multiple CSI-RS resources; per-CSI-RS-resource feedback with inter-CSI-RS-resource feedback; per-CSI-RS-resource feedback; and per cell Rel-8 CRS-based feedback. Thereby, the composed feedback scheme shall include at least one of the first three stated feedback forms. In addition, sounding reference signals (SRS) may also be taken into account.

As a further aspect of the framework, the CSI feedback for CoMP typically uses at least per-CSI-RS-resource feedback.

In further developed LTE Rel-11 the CSI feedback may include, as per CSI-RS resource feedback (that is, per point feedback), CQI, PMI and RI.

Further, the CSI feedback may include, as inter-CSI-RS resource feedback (that is, as feedback over multiple points), the following:

$RI^{CoMP}$: UE rank indicator for CoMP mode,

Inter-CSI-RS resource combiner: another form of PMI used for noncoherent/coherent JT and/or CSI-RS resource (point) selection indication, and Aggregated CQI: same definition as the CQI however characterizing the hypothesis/transmission from multiple points.

Other types of multiple point feedback may be envisaged, for example which ranks are transmitted from which points.

In addition, the CSI feedback according to LTE REL-11 may include a scheme selection codebook, which is used to identify the relevant CoMP scheme. Also the inter-CSI-RS resource combiner may be understood as a scheme selection codebook in the case it contains codebook codewords for noncoherent joint transmission and dynamic point selection in addition to the coherent joint transmission codewords.

It follows that a smooth feedback signaling design is needed in order to allow seamless operation of CoMP techniques while also providing fallback support to traditional single point schemes. Accordingly embodiments provide feedback signaling that is required to support flexible, reliable and efficient DL CoMP without major redesign of UL control signaling structures. In particular, CSI reporting using periodic PUCCH is proposed.

Figure 10:
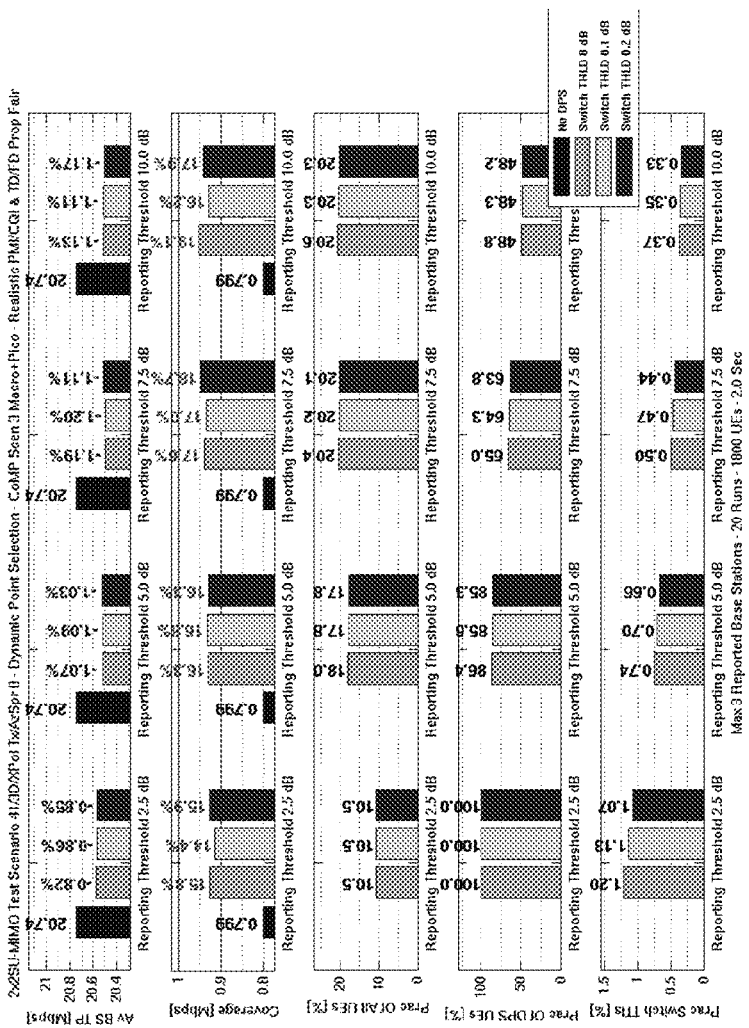
FIG. 10 shows a diagram illustrating statistics on dynamic point selection performance and number of user entities reporting CSI values versus user entities actually performing DPS.

Embodiments are based on the fact that at least some of the CoMP schemes can be expected to perform poorly with low rate PUCCH-based feedback since this feedback is wideband and many CoMP schemes require frequency-selective feedback in order to provide CoMP benefits. On the other hand, it is known that sometimes, even though UE is reporting Full rate CSI feedback on PUSCH and hence eNB has full multi point CSI available, the eNB stops using CoMP since it is not seen beneficial from the system point of view. FIG. 10 shows system-level simulation results on dynamic point selection performance, including statistics on how often UEs that report full CoMP CSI report are actually scheduled using dynamic point selection. With respect to the fourth row of diagrams, it is seen that with slightly higher reporting pathloss threshold values, the percentage of UEs actually scheduled using dynamic point selection might be as low as around 50%-60%. Hence a UE reporting full CSI reports might be only consuming uplink bandwidth and also consuming UE battery for zero system benefit.

According to an embodiment, a one-bit CoMP feedback indicator is included in the periodic PUCCH report. This CoMP feedback indicator indicates whether it would be worthwhile to report full CSI feedback report for CoMP purposes. This indication bit may then be used by the eNB to trigger aperiodic full CoMP CSI feedback reports on PUSCH. That is, the CoMP feedback indicator indicates a recommendation for an eNB to request transmission of full CoMP CSI feedback.

CoMP reporting may be deemed at the UE side to be beneficial for example if an aggregated channel quality metric (e.g. aggregated CoMP CQI) is better than a single-point channel quality metric (e.g. single-point CQI). Alternatively, CoMP reporting may be deemed at the UE side to be beneficial if the aggregated channel quality metric (e.g. aggregated CoMP CQI) is better than the single-point channel quality metric (e.g. single-point CQI) by a pre-defined threshold. For efficient selection between CoMP or single-point transmission, each metric indicative of a channel and/or transmission quality may be used.

FIG. 1 shows a flowchart of an example of a procedure at a CoMP user entity according to exemplary embodiments.

As shown in FIG. 1, the exemplary procedure includes an operation of generating a feedback indicator (step 101) for coordinated multi-point operations indicating a recommendation for a CoMP controller entity to request signaling of multi-point feedback information with respect to multiple coordinated multi-point transmission points, and an operation of signaling (step 103) the generated feedback indicator for coordinated multi-point operations to the CoMP controller entity.

According to exemplary embodiments, the feedback indicator indicates a recommendation to request signaling of multi-point feedback information. That is, such a feedback indicator presents a judgment of the CoMP user entity whether it would be worthwhile to report a full CSI feedback report, i.e., multi-point feedback information or not.

Figure 2:
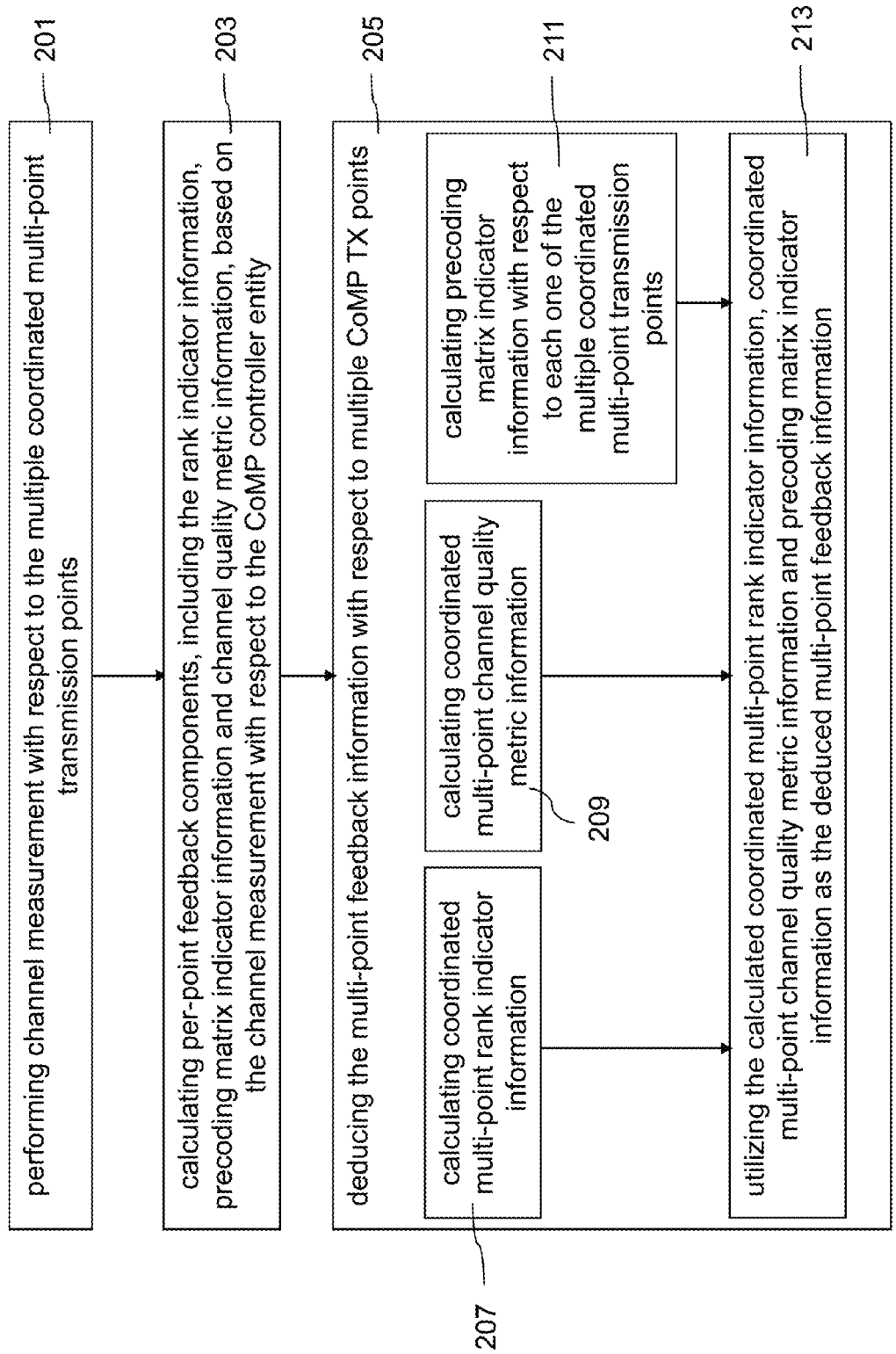
FIG. 2 shows a flowchart of an example of a procedure at a CoMP user entity according to an exemplary embodiment.

FIG. 2 shows a flowchart of an example of a procedure at a CoMP user entity according to an exemplary embodiment.

As shown in FIG. 2, the exemplary procedure involves an operation of performing channel measurement (step 201) with respect to the multiple coordinated multi-point transmission points, an operation of calculating (step 203) per-point feedback components, including the rank indicator information, precoding matrix indicator information and channel quality metric information, based on the channel measurement with respect to the CoMP controller entity, and an operation of deducing (step 205) the multi-point feedback information based on the channel measurement with respect to multiple coordinated multi-point transmission points.

Thus, in this embodiment a channel corresponding to multiple points based on configured CSI-RS resources is measured (step 201). Based on those measurements, per-point feedback components that form a full CSI report for the CoMP controller entity including RI, CQI (as an example for possible channel quality metrics) and PMI are calculated (step 203). Further, multi-point feedback information, that is, full CSI report for CoMP on the configured CSI-RS resource is deduced (step 205). As can be seen in FIG. 2, deducing includes calculating CoMP rank indicator $RI_{CoMP}$ (step 207), calculating an exemplary CoMP channel quality identifier $CQI_{CoMP}$ (step 209), and calculating a relevant PMI(s) (step 211). Further, possible inter-CSI-RS resource phase/amplitude information and other CoMP feedback components may be computed. The thus calculated components are utilized as the multi-point feedback information (full CSI report for CoMP), as indicated in step 213.

Figure 3:
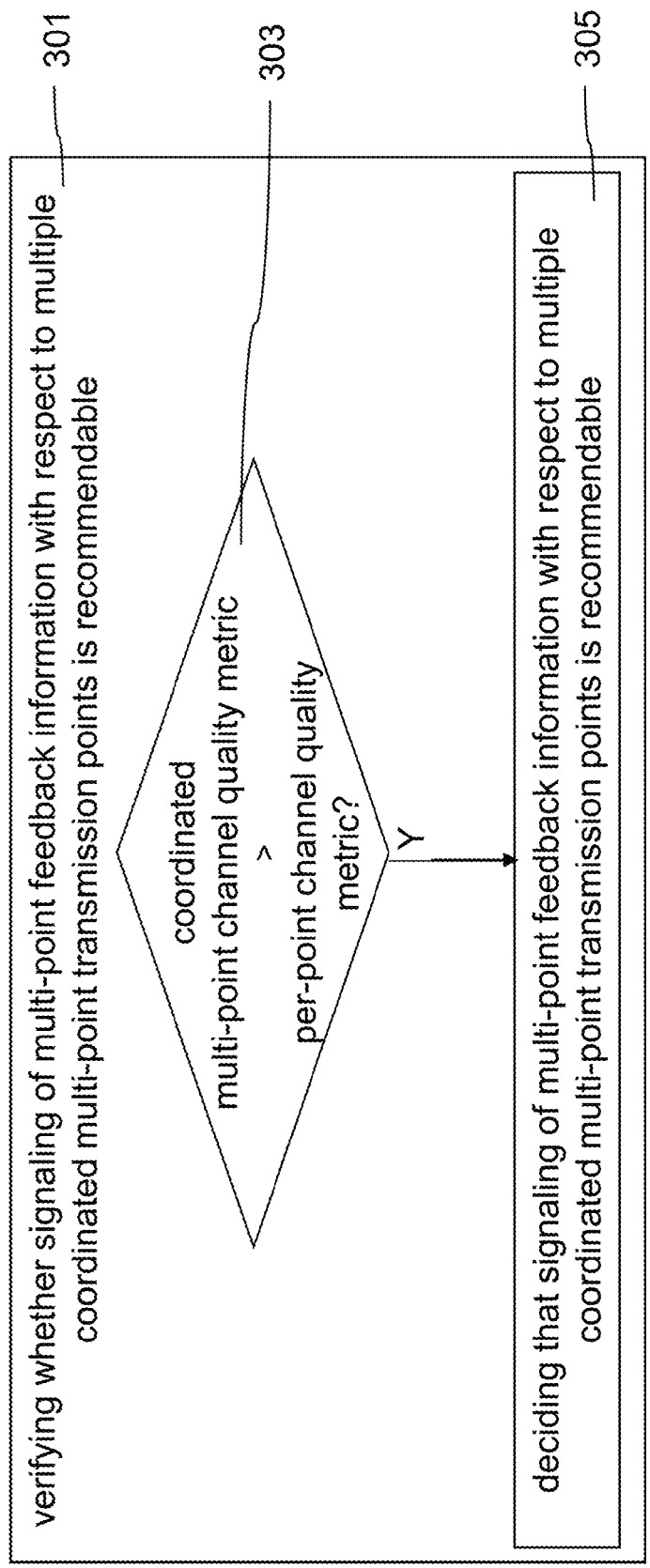
FIG. 3 shows a flowchart of an example of a procedure at a CoMP user entity according to an exemplary embodiment.

FIG. 3 shows a flowchart of an example of a procedure at a CoMP user entity according to exemplary embodiments.

As shown in FIG. 3, the exemplary procedure includes an operation of verifying (step 301) whether signaling of multi-point feedback information with respect to multiple coordinated multi-point transmission points is recommendable on the basis of at least the per-point channel quality metric information calculated with respect to the CoMP controller entity and the calculated coordinated multi-point channel quality metric information.

This verifying may be implemented by comparing the CoMP channel quality metric with the per-point channel quality metric of the CoMP controller entity (step 303). As can be seen in FIG. 3, the method involves executing an operation of deciding (step 305) that signaling of multi-point feedback information with respect to multiple coordinated multi-point transmission points is recommendable, in the event that the calculated coordinated multi-point channel quality metric information is larger than the per-point channel quality metric information calculated with respect to the CoMP controller entity, i.e., when exemplarily using a CQI as the channel quality metric, if $CQI_{CoMP}>CQI$.

Figure 4:
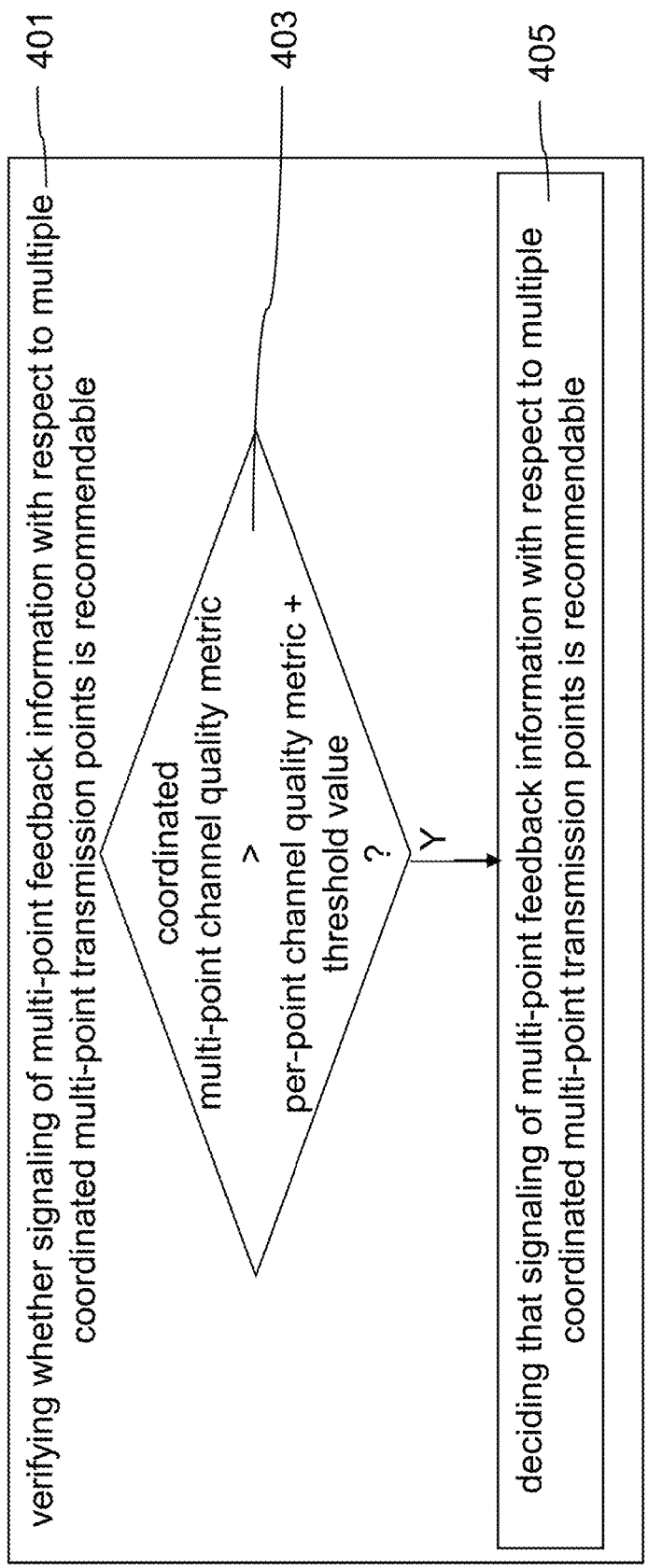
FIG. 4 shows a flowchart of an example of a procedure at a CoMP user entity according to an exemplary embodiment.

FIG. 4 shows a flowchart of an example of a procedure at a CoMP user entity according to an exemplary embodiment.

As shown in FIG. 4, this exemplary procedure involves an operation of verifying (step 401) whether signaling of multi-point feedback information with respect to multiple coordinated multi-point transmission points is recommendable on the basis of at least the per-point channel quality metric information calculated with respect to the CoMP controller entity and the calculated coordinated multi-point channel quality metric information.

This verifying may be implemented as comparing the CoMP CQI with the per-point CQI (in general, CoMP channel quality metric with the per-point channel quality metric) of the CoMP controller entity (step 403). As can be seen in FIG. 4, the method thereafter includes an operation of deciding (step 405) that signaling of multi-point feedback information with respect to multiple coordinated multi-point transmission points, which can be seen as inter-point feedback information with respect to multiple coordinated multi-point transmission points, is recommendable, in the event that the calculated coordinated multi-point channel quality metric information is larger than the per-point channel quality metric information calculated with respect to the CoMP controller entity by a pre-determined threshold value, i.e., when exemplarily using a CQI as the channel quality metric, if $CQI_{CoMP}>CQI+\Delta$, wherein $\Delta$ represents the pre-determined threshold value and may, according to exemplary embodiments, be configured by the eNB to the llJE.

Figure 5:
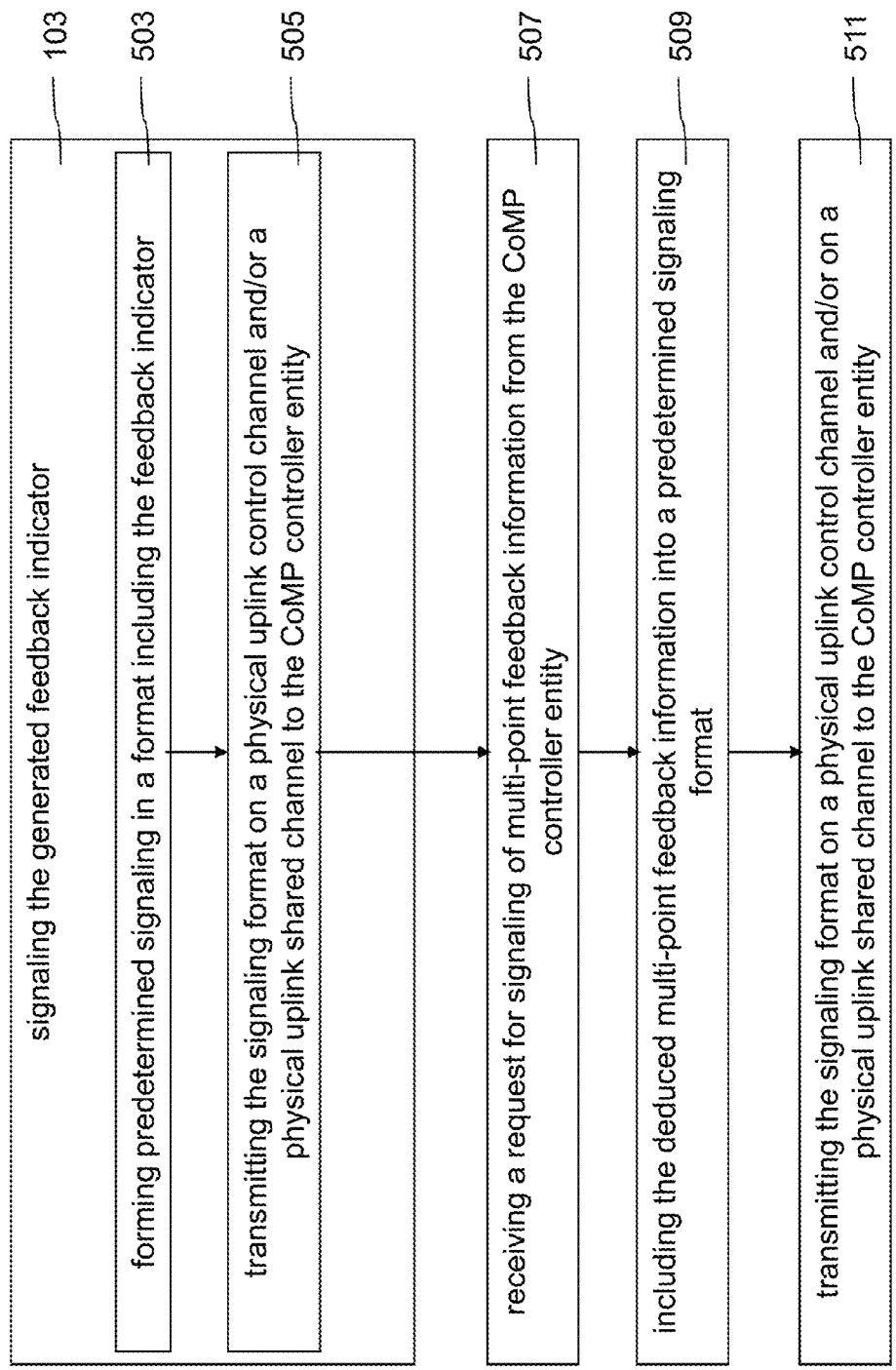
FIG. 5 shows a flowchart of an example of a procedure at a CoMP user entity according to an exemplary embodiment.

FIG. 5 shows a flowchart of an example of a procedure at a CoMP user entity according to an exemplary embodiment.

As shown in FIG. 5, the aforementioned step of signaling (step 103, see FIG. 1) the generated feedback indicator for coordinated multi-point operations to the CoMP controller entity may include forming (step 503) predetermined signaling in a format that includes the feedback indicator, and transmitting (step 505) the signaling format on a physical uplink control channel and/or a physical uplink shared channel to the CoMP controller entity.

It is to be noted that the forming of the predetermined signaling format including the feedback indicator may be performed in various ways.

For example, the feedback indicator may be included alone in a PUCCH report; that is, the feedback indicator may be included into a signaling field of a predetermined signaling format.

Alternatively, the feedback indicator may be included together with other CSI information in the periodic PUCCH report; that is, the feedback indicator may be included together with at least one component of the calculated per-point feedback components into signaling fields of a predetermined signaling format.

Further, the feedback indicator may be jointly coded with RI in the PUCCH report; that is, the feedback indicator may be jointly encoded with the per-point rank indicator information calculated with respect to the CoMP controller entity and including the result of the joint encoding into a signaling field of a predetermined signaling format. It is to be noted that the RI is carried in a report separated from PMI and CQI.

In a yet further embodiment, the feedback indicator ma be jointly coded with PMI and CQI; that is, the feedback indicator may be jointly encoded with the per-point precoding matrix indicator information and the channel quality metric information calculated with respect to the CoMP controller entity and including the result of the joint encoding into a signaling field of a predetermined signaling format. It is to be noted that in case the rank is 2, the number of bits for PMI and CQI may need to be reduced to make the bit fit within the PUCCH bit budget.

It is to be noted that in certain scenarios, such an indicator bit could be also beneficial to be included in the PUSCH report such that the eNB can learn when requesting CoMP is to be stopped.

Returning to FIG. 5, the method thereafter involves an operation of receiving (step 507) a request for signaling of multi-point feedback information from the CoMP controller entity; including (step 509) the deduced multi-point feedback information into a predetermined signaling format; and transmitting (step 511) the signaling format in a physical uplink control channel and/or on a physical uplink shared channel to the CoMP controller entity.

Figure 6:
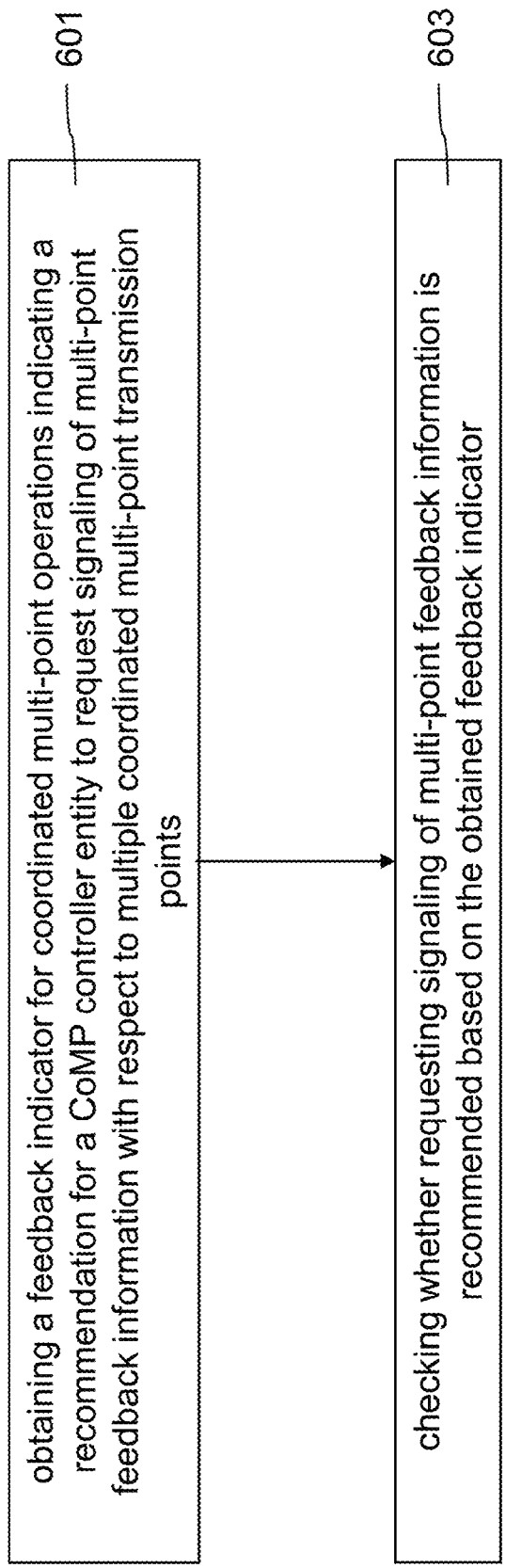
FIG. 6 shows a flowchart of an example of a procedure at a CoMP TX point according to an exemplary embodiment.

FIG. 6 shows a flowchart of an example of a procedure at a CoMP TX point according to exemplary embodiments.

As shown in FIG. 6, the exemplary procedure involves an operation of obtaining (step 601) a feedback indicator for coordinated multi-point operations indicating a recommendation for a CoMP controller entity to request signaling of multi-point feedback information with respect to multiple coordinated multi-point transmission points, and an operation of checking (step 603) whether requesting signaling of multi-point feedback information is recommended based on the obtained feedback indicator.

Figure 7:
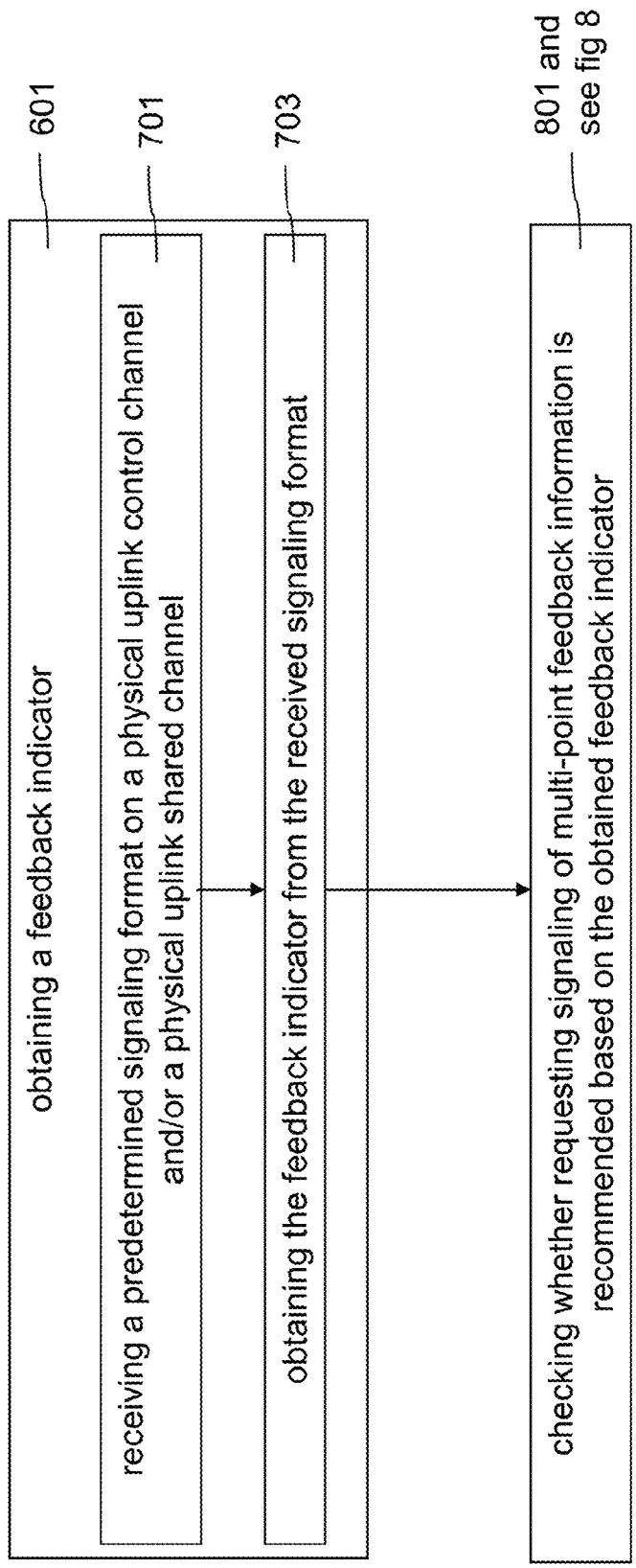
FIG. 7 shows a flowchart of an example of a procedure at a CoMP TX point according to an exemplary embodiment.

FIG. 7 shows a flowchart of an example of a procedure at a CoMP TX point according to exemplary embodiments, in particular as regards the obtaining step 601 shown in FIG. 6.

As shown in FIG. 7, in the exemplary arrangement, a predetermined signaling format is received (step 701) on a physical uplink control channel and/or a physical uplink shared channel and thereafter the feedback indicator is obtained from the received signaling format (step 703).

According to exemplary embodiments, the predetermined signaling format is received periodically on PUCCH as a periodical PUCCH report.

It is to be noted that the step of obtaining the feedback indicator may be performed in various ways based on the above described methods of forming the signaling format, as discussed in relation to FIG. 5.

For example, the feedback indicator may be obtained by deriving the feedback indicator from a signaling field of said signaling format.

Further, the feedback indicator may be obtained by deriving the feedback indicator included together with at least one component of per-point feedback components from a signaling field of said signaling format.

Alternatively, the feedback indicator may be obtained by decoding the feedback indicator jointly encoded with per-point rank indicator information from a signaling field of said signaling format.

As a yet further alternative, the feedback indicator may be obtained by decoding the feedback indicator jointly encoded with per-point precoding matrix indicator information and channel quality metric information from a signaling field of said signaling format.

Figure 8:
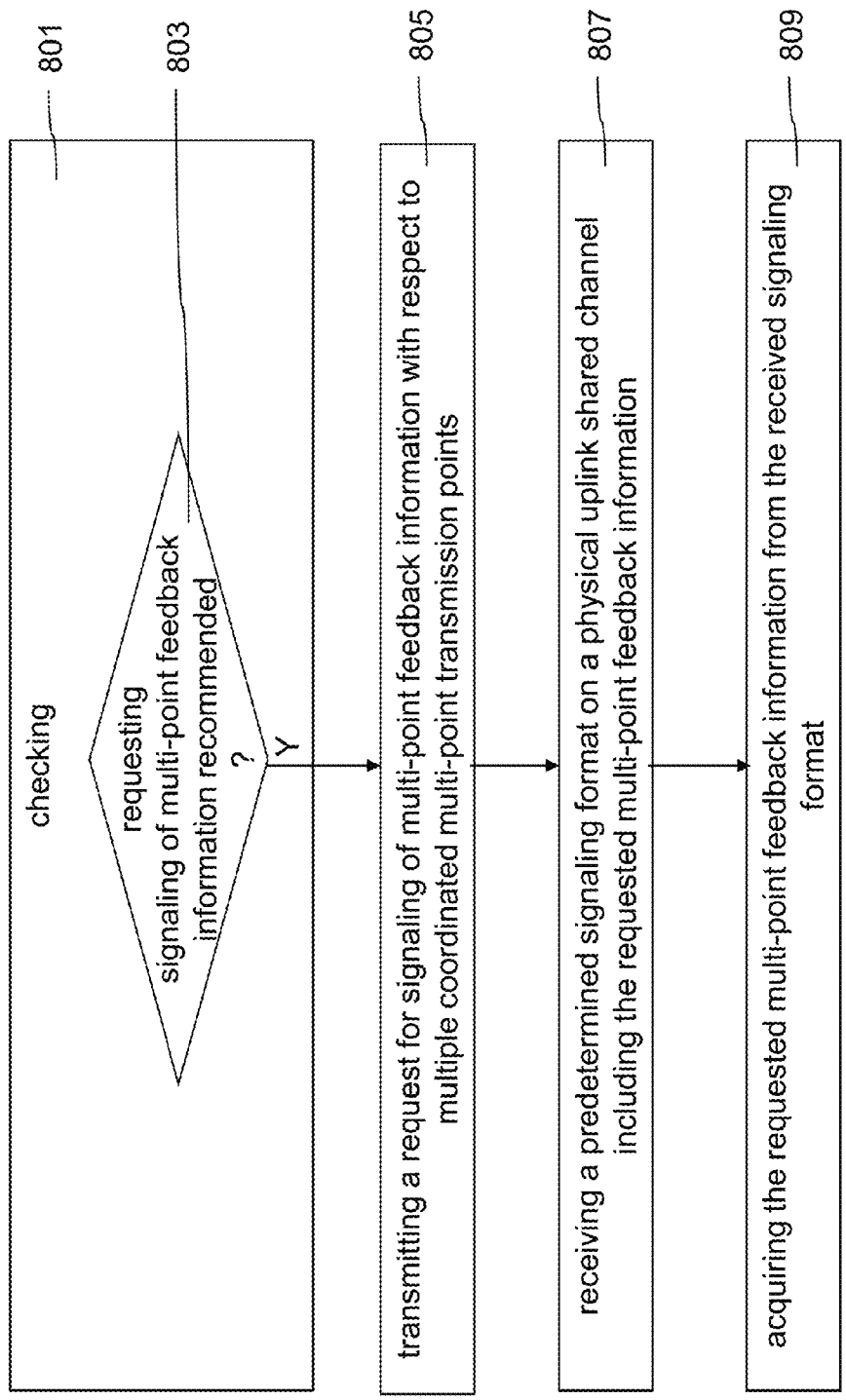
FIG. 8 shows a flowchart of an example of a procedure at a CoMP TX point according to an exemplary embodiment.

FIG. 8 shows a flowchart of an example of a procedure at a CoMP TX point according to exemplary embodiments.

As shown in FIG. 8, the procedure involves an operation of checking (step 801) whether requesting signaling of multi-point feedback information is recommended based on the obtained feedback indicator.

In one arrangement, this involves checking whether requesting signaling of multi-point feedback information is recommended (step 803), which may be evaluated by the eNB evaluating the CoMP feedback indicator bit.

The procedure subsequently includes transmitting (step 805) a request for signaling of multi-point feedback information with respect to multiple coordinated multi-point transmission points, if requesting signaling of multi-point feedback information is recommended based on the obtained feedback indicator.

It is to be noted that the decision as to whether such a request is to be performed is preferably directed to the CoMP TX point itself. That is, if the CoMP feedback indicator bit indicates that CoMP CSI reporting could be beneficial, the eNB may transmit such CSI feedback trigger to request the full CoMP CSI report.

The procedure thereafter includes receiving (step 807) a predetermined signaling formal on a physical uplink shared channel, or on one or multiple physical uplink control channel(s), including the requested multi-point feedback information, and an operation of acquiring (step 809) the requested multi-point feedback information from the received signaling format.

Exemplary embodiments provide for a common feedback framework for coordinated multi-point operations of various coordinated multi-point schemes and/or scenarios (in/for cellular communication systems). That is, there is provided a common feedback signaling design for various coordinated multi-point schemes and/or scenarios, which is effective in terms of allowing seamless coordinated multi-point operations and providing fallback support to single-point operations.

The common feedback framework according to exemplary embodiments is suitable for any CoMP scenario, specifically but not exclusively the CoMP scenarios 1 to 4 mentioned in the background section, and for any such CoMP scenario which supports any CoMP scheme/category, specifically but not exclusively the aforementioned CoMP schemes/categories such as CoMP JT, DPS and CS/CB (with or without dynamic point blanking/muting, respectively).

The common feedback framework according to exemplary embodiments is capable of reusing specified (LTE PUCCH) signaling to a large extent.

Accordingly, by virtue of the common feedback framework according to exemplary embodiments, implementation synergy with existing communication systems and/or network deployments (e.g. LTE releases/specifications) may be maximized. That is, the common feedback framework according to exemplary embodiments supports flexible, reliable and efficient DL CoMP without the need for (major) redesign of UL control signaling structures.

Generally, the above-described procedures and functions may be implemented by respective functional elements, processors, or the like, as described below.

While in the foregoing exemplary embodiments vention are described mainly with reference to methods, procedures and functions, corresponding exemplary embodiments also cover respective apparatuses, network nodes and systems, including both software, algorithms, and/or hard ware thereof.

Respective exemplary embodiments are described below referring to FIG. 9, while for the sake of brevity reference is made to the detailed description with regard to FIGS. 1 to 8.

Figure 9:
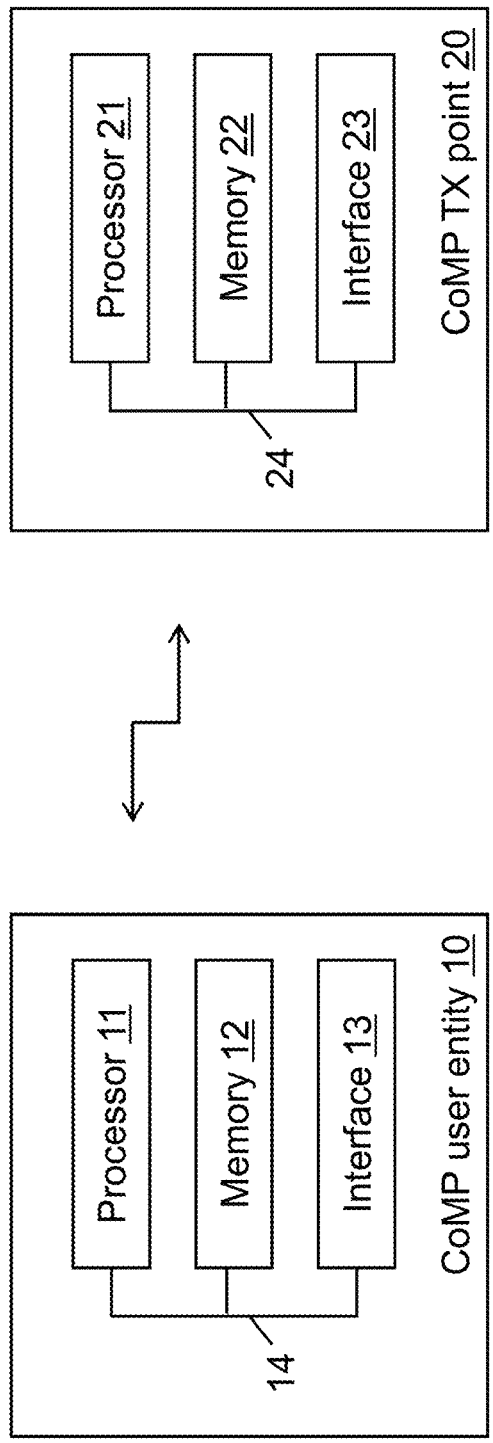
FIG. 9 shows a schematic block diagram illustrating exemplary apparatuses according to an exemplary embodiment.

In FIG. 9 below, which is noted to represent a simplified block diagram, the solid line blocks are basically configured to perform respective operations as described above. The entirety of solid line blocks are basically configured to perform the methods and operations as described above, respectively. With respect to FIG. 9, it is to be noted that the individual blocks are meant to illustrate respective functional blocks implementing a respective function, process or procedure, respectively. Such functional blocks are implementation-independent, i.e. may be implemented by means of any kind of hardware or software, respectively. The arrows and lines interconnecting individual blocks are meant to illustrate an operational coupling there-between, which may be a physical and/or logical coupling, which on the one hand is implementation-independent (e.g. wired or wireless) and on the other hand may also include an arbitrary number of intermediary functional entities not shown. The direction of arrow is meant to illustrate the direction in which certain operations are performed and/or the direction in which certain data is transferred.

Further, in FIG. 9, only those functional blocks are illustrated, which relate to any one of the above-described methods, procedures and functions. A skilled person will acknowledge the presence of any other conventional functional blocks required for an operation of respective structural arrangements, such as e.g. a power supply, a central processing unit, respective memories or the like. Among others, memories are provided for storing programs or program instructions for controlling the individual functional entities to operate as described herein.

FIG. 9 shows a schematic block diagram illustrating exemplary apparatuses according to exemplary embodiments.

In view of the above, the thus illustrated apparatuses 10 and 20 are suitable for use in practicing the exemplary embodiments, as described herein.

The thus illustrated apparatus 10 may represent a (part of a) CoMP user entity, and the thus illustrated apparatus 20 may represent a (part of a) CoMP TX point which is operable to act as the CoMP controller entity of the CoMP user entity of apparatus 10.

As described above, the CoMP user entity of apparatus 10, i.e. apparatus 10 as such, may be a (part of) a terminal side entity of a cellular communication system, such as a UE or a modem (which may be installed as part of the UE, but may be also a separate module, which can be attached to various devices) or the like of a LTE/LTE-A system, and the CoMP TX point of apparatus 20, i.e., apparatus 20 as such, may be a (part of) a network side entity of a cellular communication system, such as an eNB or a modem (which may be installed as part of the eNB, but may be also a separate module, which can be attached to various devices) of a LTE/LTE-A system or the like. It is noted that the CoMP TX point of apparatus 20, i.e. apparatus 20 as such, may be operable or implemented at/in/by different (types of) network side entities in accordance with an underlying CoMP scenario.

As indicated in FIG. 9, according to exemplary embodiments, each of the apparatuses includes a processor 11/22, a memory 12/22 and an interface 13/23, which are connected by a bus 14/24 or the like.

The interface 13/23 may include a suitable receiver or a suitable transmitter-receiver combination or transceiver, which is coupled to one or more antennas or communication means for (hardwire or wireless) communications with the linked or connected device(s), respectively. The interface 13/23 is generally configured to communicate with another apparatus, i.e. the interface thereof.

The memory 12/22 may store respective programs assumed to include program instructions or computer program code that, when executed by the respective processor, enables the respective electronic device or apparatus to operate in accordance with the exemplary embodiments. For example, the memory 12 of the apparatus 10 may store pre-configured CSI-RS configurations for channel measurement purposes, the memory 22 of the apparatus 20 may store received CSI feedback for CoMP operation purposes, and so on.

In general terms, the respective devices/apparatuses (and/or parts thereof) may represent means for performing respective operations and/or exhibiting respective functionalities, and/or the respective devices (and/or parts thereof) may have functions for performing respective operations and/or exhibiting respective functionalities.

When in the subsequent description it is stated that the processor (or some other means) is configured to perform some function, this is to be construed to be equivalent to a description stating that at least one processor, potentially in cooperation with computer program code stored in the memory of the respective apparatus, is configured to cause the apparatus to perform at least the thus mentioned function. Also, such function is to be construed to be equivalently implementable by specifically configured means for performing the respective function (i.e. the expression "processor configured to [cause the apparatus to] perform xxx-ing" is construed to be equivalent to an expression such as "means for xxx-ing").

According to exemplary embodiments, an apparatus representing the apparatus 10 includes at least one processor 11, at least one memory 12 including computer program code, and at least one interface 13 configured for communication with at least another apparatus. The apparatus 10, i.e. the processor (namely, the at least one processor 1, with the at least one memory 12 and the computer program code), is configured to perform generating a feedback indicator forr coordinated multi-point operations indicating a recommendation for a CoMP controller entity to request signaling of multi-point feedback information with respect to multiple coordinated multi-point transmission points, and signaling the generated feedback indicator for coordinated multi-point operations to the CoMP controller entity.

In its most basic form, stated in other words, the apparatus 10 ray thus include respective means for generating a feedback indicator and means for signaling generated feedback indicator.

As outlined above, in enhanced forms, the apparatus 10 may include one or more of respective means for performing channel measurement, means for calculating per-point feedback components, means for deducing multi-point feedback information, means for calculating coordinated multi-point rank indicator information, means for calculating coordinated multi-point channel quality metric information, means for calculating precoding matrix indicator information, means for verifying, means for deciding that signaling of multi-point feedback information is recommendable, means for including data into predetermined signaling format, means for transmitting the signaling format, and means for receiving a request.

According to exemplary embodiments, an apparatus representing the apparatus 20 includes at least one processor 21, at least one memory 22 including computer program code, and at least one interface 23 configured for communication with at least another apparatus. The apparatus 20, i.e. the processor (namely, the at least one processor 21, with the at least one memory 22 and the computer program code), is configured to perform obtaining a feedback indicator for coordinated multi-point operations indicating a recommendation for a CoMP controller entity to request signaling of multi-point feedback information with respect to multiple coordinated multi-point transmission points, and checking whether requesting signaling of multi-point feedback information is recommended based on the obtained feedback indicator.

In its most basic form, stated in other words, the apparatus 20 may thus include respective means for obtaining a feedback indicator and means for checking whether requesting signaling of multi-point feedback information is recommended.

As outlined above, in enhanced forms, the apparatus 20 may include one or more of respective means for receiving a signaling format, means for getting the feedback indicator from the received signaling format, means for transmitting a request for signaling multi-point feedback information, and means for acquiring multi-point feedback information.

For further details of specifics regarding functionalities according to exemplary embodiments, reference is made to the foregoing description in conjunction with FIGS. 1 to 8.

According to exemplary embodiments, uplink overhead and power consumption of the user entity, i.e. the UE, can be reduced. The user entity indicates that CoMP CSI feedback reports would be beneficial from its view (the user entity's view). The CoMP controller entity, i.e. the eNB, would not trigger the UE to transmit full CSI reports for CoMP unless CoMP CSI feedback reports are beneficial from its perspective (the eNBs perspective). Thus the two components: the UE and the eNB collectively assess whether CoMP CSI feedback reports are beneficial from systems view.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any structural means such as a processor or other circuitry may refer to one or more of the following: (a) hardware-only circuit implementations (such as implementations in only analog and/or digital circuitry) and (b) combinations of circuits and software (and/or firmware), such as (as applicable): (i) a combination of processor(s) or (ii) portions of processor(s)/software (including digital signal processor(s)), software, and memory(ies) that work together to cause an apparatus, such as a mobile phone or server, to perform various functions) and (c) circuits, such as a microprocessor(s) or a portion of a microprocessor(s), that require software or firmware for operation, even if the software or firmware is not physically present. Also, it may also cover an implementation of merely a processor (or multiple processors) or portion of a processor and its (or their) accompanying software and/or firmware, any integrated circuit, or the like.

Generally, any procedural step or functionality is suitable to be implemented as software or by hardware without changing the idea of the present invention. Such software may be software code independent and can be specified using any known or future developed programming language, such as e.g. Java, C++, C, and Assembler, as long as the functionality defined by the method steps is preserved. Such hardware may be hardware type independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components. A device/apparatus may be represented by a semiconductor chip, a chipset, system in package, or a (hardware) module including such chip or chipset; this, however, does not exclude the possibility that a functionality of a device/apparatus or module, instead of being hardware implemented, be implemented as software in a (software) module such as a computer program or a computer program product including executable software code portions for execution/being run on a processor. A device may be regarded as a device/apparatus or as an assembly of more than one device/apparatus, whether functionally in cooperation with each other or functionally independently of each other but in a same device housing, for example.

Apparatuses and/or means or parts thereof can be implemented as individual devices, but this does not exclude that they may be implemented in a distributed fashion throughout the system, as long as the functionality of the device is preserved. Such and similar principles are to be considered as known to a skilled person.

Software in the sense of the present description includes software code as such including code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

Exemplary embodiments of the present invention may be applied for any kind of network environment, such as for example for communication systems in accordance with any one of 3GPP standards, LTE standards of release 11/12/ (including LTE-Advanced and its evolutions), UMTS standards, and WCDMA standards. In particular, exemplary embodiments may be applied to any CoMP and/or MIMO techniques which are a feature e.g. of 3GPP LTE standards of release 11/12 and onwards.

Even though the present invention and/or exemplary embodiments are described above with reference to the examples according to the accompanying drawings, it is to be understood that they are not restricted thereto. Rather, it is apparent to those skilled in the art that the present invention can be modified in many ways without departing from the scope of the inventive idea as disclosed herein.

LIST OF ACRONYMS AND ABBREVIATIONS

3GPP 3rd Generation Partnership Project
BS base station
CB coordinated beamforming
CoMP coordinated multi-point (transmission/reception)
CQI channel quality indicator
CS coordinated scheduling
CSI channel state information
CSI-RS CSI reference symbol
DL Downlink
DM-RS demodulation reference symbol
DPS dynamic point selection
eNB evolved NodeB
JP joint processing
JT joint transmission
LT Long Term Evolution
LTE-A Long Term Evolution Advanced
MIMO multiple-input multiple-output
MU multi-user
PDSCH physical downlink shared channel
PMI precoding matrix indicator
PUSCH physical uplink shared channel
PUCCH physical uplink control channel
RI rank indicator
ROI rank order indicator
RRH radio remote head
RS reference symbol
SINR signal to interference plus noise ratio
SRS sounding reference signal
SU single-user
TX transmission
UE user equipment
UL uplink
UMTS Universal Mobile Telecommunications System
WCDMA Wideband Code Division Multiple Access

The invention claimed is:
1. A method comprising;
generating a feedback indicator for coordinated multi-point operations, the feedback indicator indicating a recommendation for a coordinated multi-point (CoMP) controller entity on whether to request signaling of multi-point feedback information with respect to multiple coordinated multi-point transmission points;

wirelessly signaling the generated feedback indicator for coordinated multi-point operations to the CoMP controller entity, the CoMP controller entity comprising a network side entity of a wireless communication system; and receiving a request for signaling of multi-point feedback information from the CoMP controller entity responsive to the recommendation indicated by the feedback indicator signaled to the CoMP controller entity.

2. The method according to claim 1, further comprising:
performing channel measurement with respect to the multiple coordinated multipoint transmission points,
calculating per-point feedback components, including the rank indicator information, precoding matrix indicator information and channel quality metric information, based on the channel measurement with respect to the CoMP controller entity, and
deducing the multi-point feedback information based on the channel measurement with respect to multiple coordinated multi-point transmission points.

3. The method according to claim 2, wherein the deducing comprises:
calculating coordinated multi-point rank indicator information,
calculating coordinated multi-point channel quality metric information,
calculating precoding matrix indicator information with respect to each one of the multiple coordinated multi-point transmission points, and
utilizing the calculated coordinated multi-point rank indicator information, coordinated multi-point channel quality metric information and precoding matrix indicator information as the deduced multi-point feedback information.

4. The method according to claim 3, wherein the generating comprises:
verifying whether signaling of multi-point feedback information with respect to multiple coordinated multi-point transmission points is recommendable on the basis of at least the per-point channel quality metric information calculated with respect to the CoMP controller entity and the calculated coordinated multi-point channel quality metric information.

5. The method according to claim 4, wherein the verifying comprises one of:
determining whether the calculated coordinated multi-point channel quality metric information is larger than the per-point channel quality metric information calculated with respect to the CoMP controller entity, and
determining whether the calculated coordinated multi-point channel quality metric information is larger than the per-point channel quality metric information calculated with respect to the CoMP controller entity by a predetermined threshold value, and the method further comprises deciding that signaling of multi-point feedback information with respect to multiple coordinated multi-point transmission points is recommendable, on the basis of the determinations.

6. The method according to claim 2, wherein the signaling comprises one of:
including the feedback indicator into a signaling field of a predetermined signaling format,
including the feedback indicator together with at least one component of the calculated per-point feedback components into signaling fields of a predetermined signaling format;
jointly encoding the feedback indicator with the per-point rank indicator information calculated with respect to the CoMP controller entity and including the result of the joint encoding into a signaling field of a predetermined signaling format, and
jointly encoding the feedback indicator with the per-point precoding matrix indicator information and the channel quality metric information calculated with respect to the CoMP controller entity and including the result of the joint encoding into a signaling field of a predetermined signaling format,
wherein the signaling further comprises:
transmitting the signaling format on a physical uplink control channel and/or a physical uplink shared channel to the CoMP controller entity.

7. A method comprising:
obtaining, in a wireless transmission, a feedback indicator for coordinated multi-point operations, the feedback indicator indicating a recommendation for a coordinated multi-point (CoMP) controller entity on whether to request signaling of multi-point feedback information with respect to multiple coordinated multi-point transmission points, the CoMP controller entity comprising a network side entity of a wireless communication system;
checking whether requesting signaling of multi-point feedback information is recommended based on the obtained feedback indicator; and
transmitting from the CoMP controller entity a request for signaling of multi-point feedback information with respect to multiple coordinated multi-point transmission points, if requesting signaling of multi-point feedback information is recommended based on the obtained feedback indicator.

8. A method comprising:
obtaining, in a wireless transmission, a feedback indicator for coordinated multi-point operations, the feedback indicator indicating a recommendation for a coordinated multi-point (CoMP) controller entity on whether to request signaling of multi-point feedback information with respect to multiple coordinated multi-point transmission points, the CoMP controller entity comprising a network side entity of a wireless communication system;
checking whether requesting signaling of multi-point feedback information is recommended based on the obtained feedback indicator; and
receiving a predetermined signaling format on a physical uplink control channel and/or a physical uplink shared channel,
the obtaining further comprises one of:
deriving the feedback indicator from a signaling field of said signaling format,
deriving the feedback indicator included together with at least one component of per-point feedback components from a signaling field of said signaling format,
decoding the feedback indicator jointly encoded with per-point rank indicator information from a signaling field of said signaling format, and
decoding the feedback indicator jointly encoded with per-point precoding matrix indicator information and channel quality metric information from a signaling field of said signaling format.

9. An apparatus comprising:
at least one processor,
at least one memory including computer program code, and at least one interface configured for communication with at least another apparatus, the at least one processor, with the at least one memory and the computer program code, being configured to cause the apparatus to perform:

generating a feedback indicator for coordinated multi-point operations, the feedback indicator indicating a recommendation for a coordinated multi-point (CoMP) controller entity on whether to request signaling of multi-point feedback information with respect to multiple coordinated multi-point transmission points;

wirelessly signaling the generated feedback indicator for coordinated multi-point operations to the CoMP controller entity, the CoMP controller entity comprising a network side entity of a wireless communication system; and receiving a request for signaling of multi-point feedback information from the CoMP controller entity responsive to the recommendation indicated by the feedback indicator signaled to the CoMP controller entity.

10. The apparatus according to claim 9, wherein the at least one processor is configured to cause the apparatus to perform:

performing channel measurement with respect to the multiple coordinated multipoint transmission points, calculating per-point feedback components, including the rank indicator information, precoding matrix indicator information and channel quality metric information, based on the channel measurement with respect to the CoMP controller entity, and deducing the multi-point feedback information based on the channel measurement with respect to multiple coordinated multi-point transmission points.

11. The apparatus according to claim 10, wherein the at least one processor is configured to cause the apparatus to perform:

calculating coordinated multi-point rank indicator information, calculating coordinated multi-point channel quality metric information, calculating precoding matrix indicator information with respect to each one of the multiple coordinated multi-point transmission points, and utilizing the calculated coordinated multi-point rank indicator information, coordinated multi-point channel quality metric information and precoding matrix indicator information as the deduced multi-point feedback information.

12. The apparatus according to claim 11, wherein the at least one processor is configured to cause the apparatus to perform:

verifying whether signaling of multi-point feedback information with respect to multiple coordinated multi-point transmission points is recommendable on the basis of at least the per-point channel quality metric information calculated with respect to the CoMP controller entity and the calculated coordinated multi-point channel quality metric information.

13. The apparatus according to claim 12, wherein the at least one processor is configured to cause the apparatus to perform:

determining whether the calculated coordinated multi-point channel quality metric information is larger than the per-point channel quality metric information calculated with respect to the CoMP controller entity, and determining whether the calculated coordinated multi-point channel quality metric information is larger than the per-point channel quality metric information calculated with respect to the CoMP controller entity by a pre-determined threshold value, and the method further comprises deciding that signaling of multi-point feedback information with respect to multiple coordinated multi-point transmission points is recommendable, on the basis of the determinations.

14. The apparatus according to claim 9, wherein the at least one processor is configured to cause the apparatus to perform:

including the feedback indicator into a signaling field of a predetermined signaling format, including the feedback indicator together with at least one component of the calculated per-point feedback components into signaling fields of a predetermined signaling format:

jointly encoding the feedback indicator with the per-point rank indicator information calculated with respect to the CoMP controller entity and including the result of the joint encoding into a signaling field of a predetermined signaling format, jointly encoding the feedback indicator with the per-point precoding matrix indicator information and the channel quality metric information calculated with respect to the CoMP controller entity and including the result of the joint encoding into a signaling field of a predetermined signaling format, and transmitting the signaling format on a physical uplink control channel and/or a physical uplink shared channel to the CoMP controller entity.

15. The apparatus according to claim 9, wherein the at least one processor is configured to cause the apparatus to perform:

receiving a request for signaling of multi-point feedback information from the CoMP controller entity, including the deduced multi-point feedback information into a predetermined signaling format, and transmitting the signaling format on a physical uplink control channel and/or on a physical uplink shared channel to the CoMP controller entity.

16. An apparatus comprising:

at least one processor, at least one memory including computer program code, and at least one interface configured for communication with at least another apparatus, the at least one processor, with the at least one memory and the computer program code, being configured to cause the apparatus to perform:

obtaining, in a wireless transmission, a feedback indicator for coordinated multi-point operations, the feedback indicator indicating a recommendation for a coordinated multi-point (CoMP) controller entity on whether to request signaling of multi-point feedback information with respect to multiple coordinated multi-point transmission points, the CoMP controller entity comprising a network side entity of a wireless communication system;

checking whether requesting signaling of multi-point feedback information is recommended based on the obtained feedback indicator;

transmitting from the CoMP controller entity a request for signaling of multi-point feedback information with respect to multiple coordinated multi-point transmission points, if requesting signaling of multi-point feedback information is recommended based on the obtained feedback indicator.

17. The apparatus according to claim 16, wherein the at least one processor is configured to cause the apparatus to perform:
- receiving a predetermined signaling format on a physical uplink shared channel including the requested multi-point feedback information, and
- acquiring the requested multi-point feedback information from the received signaling format.

18. An apparatus comprising:
- at least one processor,
- at least one memory including computer program code, and
- at least one interface configured for communication with at least another apparatus,
- the at least one processor, with the at least one memory and the computer program code, being configured to cause the apparatus to perform:
- obtaining, in a wireless transmission, a feedback indicator for coordinated multi-point operations, the feedback indicator indicating a recommendation for a coordinated multi-point (COMP) controller entity on whether to request signaling of multi-point feedback information with respect to multiple coordinated multi-point transmission points, the CoMP controller entity comprising a network side entity of a wireless communication system;
- checking whether requesting signaling of multi-point feedback information is recommended based on the obtained feedback indicator; and
- receiving a predetermined signaling formal on a physical uplink control channel and/or a physical uplink shared channel,
- the obtaining further comprises one of:
- deriving the feedback indicator from a signaling field of said signaling format,
- deriving the feedback indicator included together with at least one component of per-point feedback components from a signaling field of said signaling format,
- decoding the feedback indicator jointly encoded with per-point rank indicator information from a signaling field of said signaling format, and
- decoding the feedback indicator jointly encoded with per-point precoding matrix indicator information and channel quality metric information from a signaling field of said signaling format.

\* \* \* \* \*